(12) United States Patent
Overton et al.

(10) Patent No.: US 7,567,739 B2
(45) Date of Patent: Jul. 28, 2009

(54) FIBER OPTIC CABLE HAVING A WATER-SWELLABLE ELEMENT

(75) Inventors: Bob J. Overton, Lenoir, NC (US); Wayne Cheatle, Hickory, NC (US); Greg DeChristopher, Hickory, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 12/023,386

(22) Filed: Jan. 31, 2008

(65) Prior Publication Data

US 2008/0181564 A1    Jul. 31, 2008

Related U.S. Application Data

(60) Provisional application No. 60/887,373, filed on Jan. 31, 2007.

(51) Int. Cl.
*G02B 6/44*    (2006.01)

(52) U.S. Cl. .................. 385/100; 385/109; 385/114

(58) Field of Classification Search .............. 385/100, 385/109, 114
See application file for complete search history.

(56) References Cited

U.S. PATENT DOCUMENTS

| | | | |
|---|---|---|---|
| 4,366,206 A | 12/1982 | Tanaka | |
| 4,600,407 A | 7/1986 | Huber | |
| 4,703,998 A | 11/1987 | Uchioke et al. | |
| 4,873,143 A | 10/1989 | Tanaka | |
| 4,909,592 A | 3/1990 | Arroyo et al. | |
| 5,109,457 A | 4/1992 | Panuska et al. | |
| 5,138,685 A | 8/1992 | Arroyo et al. | |
| 5,264,251 A | 11/1993 | Geursen et al. | |
| 5,369,720 A | 11/1994 | Parry et al. | |
| 5,630,003 A * | 5/1997 | Arroyo ...................... 385/113 |
| 5,906,952 A * | 5/1999 | Everaere et al. ............. 442/356 |
| 5,925,461 A | 7/1999 | Fairgrieve | |
| 6,226,431 B1 | 5/2001 | Brown et al. | |
| 6,253,012 B1 | 6/2001 | Keller et al. | |
| 6,278,826 B1 | 8/2001 | Sheu | |
| 6,284,367 B1 | 9/2001 | Gruhn et al. | |
| 6,321,012 B1 * | 11/2001 | Shen ......................... 385/106 |
| 6,504,979 B1 | 1/2003 | Norris et al. | |
| 6,504,980 B1 | 1/2003 | Gaillard et al. | |
| 6,631,229 B1 | 10/2003 | Norris et al. | |
| 6,633,709 B2 | 10/2003 | Van Vickle et al. | |

(Continued)

FOREIGN PATENT DOCUMENTS

EP    0373846 A2    6/1990

(Continued)

OTHER PUBLICATIONS

U.S. Appl. No. 60/866,235, filed Jan. 23, 2007.

(Continued)

*Primary Examiner*—Charlie Peng
(74) *Attorney, Agent, or Firm*—Summa, Additon & Ashe, P.A.

(57) ABSTRACT

Disclosed is a fiber optic cable that includes optical fibers and a water-swellable element, such as a powder-free fabric tape, that are enclosed within a buffer tube. Adhesive material, such as discrete domains of adhesive foam, may be optionally employed to provide adhesive coupling of the optical fibers and the water-swellable element.

25 Claims, 1 Drawing Sheet

U.S. PATENT DOCUMENTS

| | | | |
|---|---|---|---|
| 6,654,526 | B2 | 11/2003 | Nechitailo et al. |
| 6,749,446 | B2 | 6/2004 | Nechitailo |
| 6,760,523 | B2 | 7/2004 | Nechitailo |
| 6,778,745 | B2 | 8/2004 | Debban, Jr. et al. |
| 6,899,776 | B2 | 5/2005 | Bahlmann et al. |
| 6,934,452 | B2 | 8/2005 | Bocanegra et al. |
| 6,970,629 | B2 | 11/2005 | Lail et al. |
| 7,006,740 | B1 | 2/2006 | Parris |
| 7,177,507 | B2 | 2/2007 | Parsons et al. |
| 7,231,119 | B2 | 6/2007 | Rhoney et al. |
| 7,236,670 | B2 | 6/2007 | Lail et al. |
| 7,254,302 | B2 | 8/2007 | Parsons et al. |
| 7,254,303 | B2 | 8/2007 | Parsons |
| 7,277,615 | B2 | 10/2007 | Greenwood et al. |
| 7,336,873 | B2 | 2/2008 | Lail et al. |
| 2002/0154873 | A1 | 10/2002 | Sheu |
| 2005/0180704 | A1 | 8/2005 | Terry et al. |
| 2005/0213902 | A1 | 9/2005 | Parsons |
| 2007/0019915 | A1 | 1/2007 | Overton et al. |
| 2007/0297730 | A1 | 12/2007 | Bringuier et al. |
| 2008/0056649 | A1* | 3/2008 | Fulbright et al. ............ 385/100 |
| 2008/0145010 | A1 | 6/2008 | Overton et al. |
| 2008/0181564 | A1 | 7/2008 | Overton et al. |

FOREIGN PATENT DOCUMENTS

| | | | |
|---|---|---|---|
| EP | 0482703 | A1 | 4/1992 |
| EP | 1746447 | A2 | 2/2007 |
| EP | 1818704 | A2 | 8/2007 |

OTHER PUBLICATIONS

U.S. Appl. No. 60/887,373, filed Jan. 31, 2007.
European Search Report in commonly owned European Application No. 06014897, dated Mar. 9, 2007.
U.S. Appl. No. 60/700,739, filed Jul. 20, 2005.
U.S. Appl. No. 60/710,654, filed Aug. 24, 2005.
U.S. Appl. No. 60/764,776, filed Feb. 3, 2006.
European Office Action in commonly owned European Application No. 06014897, dated Oct. 30, 2008.

* cited by examiner

FIBER OPTIC CABLE HAVING A WATER-SWELLABLE ELEMENT

CROSS-REFERENCE TO PRIORITY APPLICATION

This application claims the benefit of pending U.S. Provisional Application No. 60/887,373, (Fiber Optic Cable Having Powder-Free Water-Swellable Tape), filed Jan. 31, 2007, which is hereby incorporated by reference in its entirety.

FIELD OF THE INVENTION

The present invention relates to a fiber optic cable that includes optical fibers and a dry water-swellable element.

BACKGROUND

Water introduced into fiber optic cables can deteriorate the transmission capabilities of optical fibers. To prevent such degradation, water-blocking has historically been accomplished in fiber optic cables by using gels and/or greases. Water blocking, petroleum-based filling gel used in optical fiber cables blocks the ingress of water into the cable by filling the free space inside a buffer tube and mechanically couples the optical fibers to the buffer tube. That notwithstanding, such thixotropic gels and greases are messy (i.e., during splicing operations) and are therefore disfavored.

Dry, water-blocked fiber optic cables eliminate the cleaning problems associated with these gels. To create a dry cable, the filling gel may be replaced by a water-swellable element (e.g., a tape or yarn carrying or impregnated with a water-swellable material). Typical water-swellable elements include water-swellable particulate powders. Such powders are typically composed of superabsorbent polymers that, when bound on or impregnated in a tape or yarn, are dry to the touch and, accordingly, are readily removed from cables during splicing operations.

Despite the benefits of a dry powder system, the particulate powders now employed present other problems. Manufacturers have reduced the size of cabling to reduce bulk and thereby permit easier installation. This size reduction, however, increases the likelihood that the optical fibers within the fiber optic cable will be subjected to mechanical loads. To the extent particulate powders are employed, such mechanical loads can cause point-contact stresses between the discrete particles and the optical fibers. This can result in undesirable microbending and other optical attenuation.

Thus, there is the need for a dry water-blocking system that reduces the potential for microbending.

SUMMARY OF THE INVENTION

Accordingly, in one aspect, the invention embraces a fiber optic cable that includes optical fibers and a dry water-swellable element that provides desirable water blocking in a way that reduces microbending and other optical attenuation of the optical fibers.

In another aspect, the invention embraces a fiber optic cable that includes optical fibers and a water-swellable element that employs reduced amounts, if any, of superabsorbent particulate powders.

In yet another aspect, the invention embraces a fiber optic cable that includes optical fibers and a dry, water-swellable element that comprises superabsorbent polymers (SAPs).

In yet another aspect, the invention embraces a fiber optic cable that includes optical fibers and a water-swellable element that comprises superabsorbent polymer (SAP) fibers and, optionally, carrier fibers.

In yet another aspect, the invention embraces a fiber optic cable that includes optical fibers and a compressible and compliant water-swellable element that possesses excellent surface smoothness compared with conventional inserts that are coated with water-swellable particles.

In yet another aspect, the invention embraces a fiber optic cable that includes optical fibers and a water-swellable element (i) that comprises superabsorbent polymers (SAP) but reduced amounts, if any, of superabsorbent particulate powders and (ii) that is sufficiently compressible to provide meaningful cushioning to and coupling of the optical fibers.

In yet another aspect, the invention embraces a fiber optic cable that includes optical fibers that are substantially enclosed within and adhesively coupled to a water-swellable element.

In yet another aspect, the invention embraces a fiber optic cable that employs a plurality of discrete domains of adhesive material (e.g., silicone foam) to adhesively couple an optical element (e.g., an optical fiber ribbon stack) and its surrounding water-swellable element (e.g., a tape comprising superabsorbent polymeric fibers).

In yet another aspect, the invention embraces a fiber optic cable that is essentially free of thixotropic filling gels or greases to facilitate field operations, such as splicing.

The foregoing, as well as other objectives and advantages of the invention and the manner in which the same are accomplished, is further specified within the following detailed description and its accompanying drawing.

DETAILED DESCRIPTION

Figure 1:
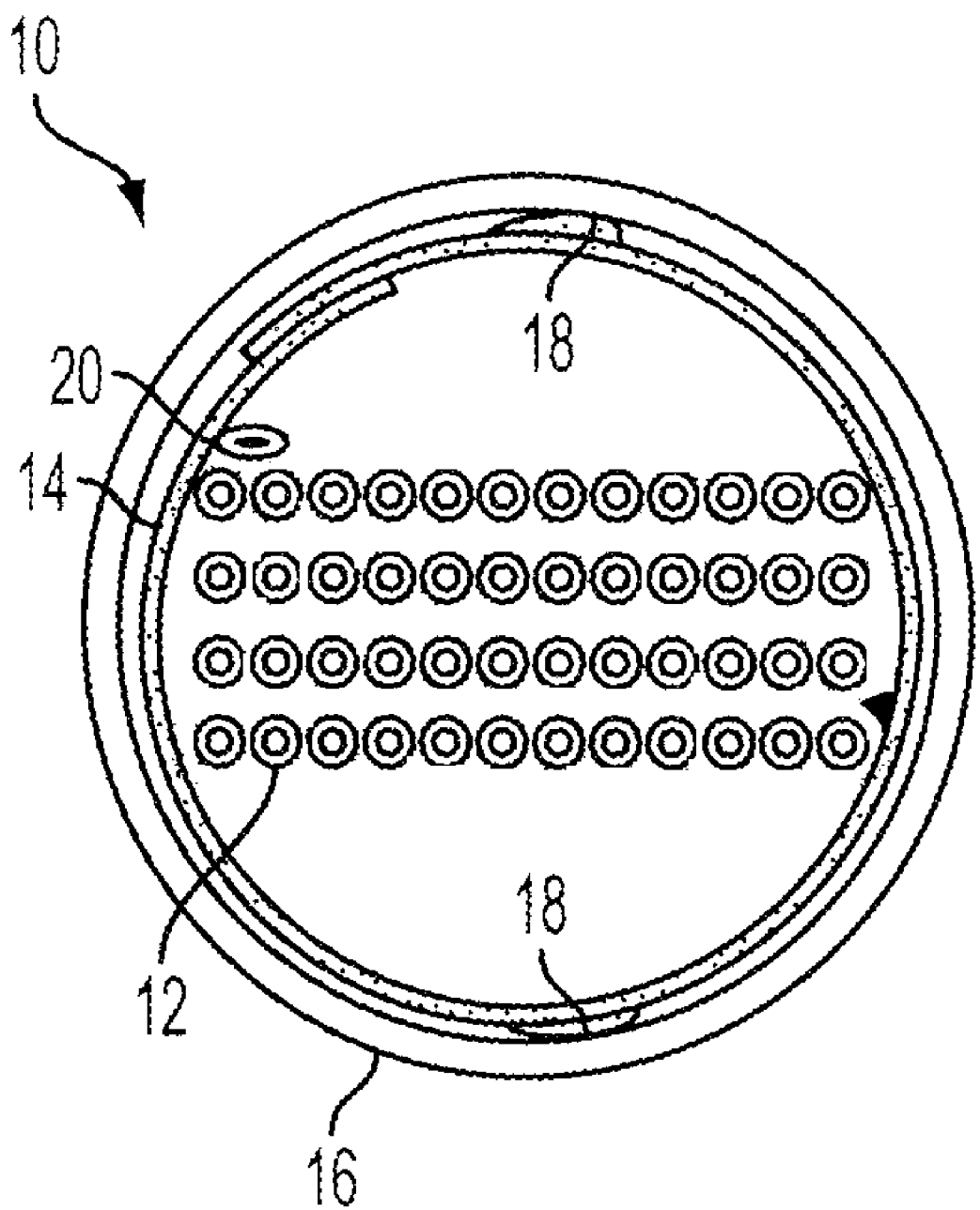
FIG. 1 schematically depicts a sectional view of an exemplary fiber optic cable according to the present invention.

In one aspect, the invention embraces a fiber optic cable that includes an optical fiber bundle (i.e., including a plurality of optical fibers) and a water-swellable element enclosed within a buffer tube. The water-swellable element—typically a water-swellable tape—may be a fabric formed from water-swellable fibers (e.g., a blend of water-swellable polymeric fibers and natural or synthetic non-water-swellable fibers). Alternatively, the water-swellable element may comprise a water-swellable foam tape (e.g., containing superabsorbent polymers). In contrast to other water-swellable inserts, the water-swellable tape according to the present invention can be substantially free of superabsorbent particulate powders, which, as noted, can cause attenuation losses.

FIG. 1 schematically illustrates a typical embodiment of a fiber optic cable according to the present invention. In this regard, the fiber optic cable 10 includes a plurality of optical fibers 12 arranged in a ribbon stack. Alternatively, the optical fibers may be loosely disposed or helically wound around each other.

A water-swellable fabric tape 14 substantially surrounds the optical fibers 12 within a buffer tube 16. Typically, the water-swellable fabric tape 14 is circumferentially positioned in the fiber optic cable 10 between the optical fibers 12 and the buffer tube 16 for the full length of fiber optic cable 10.

The composition of buffer tube 16 is not particularly limited and may include, for example, polyolefins (e.g., polypropylene or polyethylene) or polyesters (e.g., polybutylene terephthalate).

The fiber optic cable 10 may optionally include an adhesive material 18 for coupling the water-swellable fabric tape 14 to the buffer tube 16 and/or an adhesive material 20 for coupling the optical fibers 12 to the water-swellable fabric tape 14. Suitable mechanisms for coupling the water-swellable fabric tape 14 to either the optical fibers 12 or the buffer tube 16 are set forth in U.S. application Ser. No. 11/424,112 (Water-Swellable Tape, Adhesive-Backed For Coupling When Used Inside A Buffer Tube), filed Jun. 14, 2006, and published Jan. 25, 2007, as U.S. Patent Application Publication No. 2007/0019915 A1, U.S. Provisional Application No. 60/886,235 Gel-Free Buffer Tube with Adhesively Coupled Optical Element), filed Jan. 23, 2007, and U.S. application Ser. No. 12/018,604 (Gel-Free Buffer Tube with Adhesively Coupled Optical Element), filed Jan. 23, 2008, and published Jun. 19, 2008, as U.S. Patent Application Publication No. 2008/0145010 A1. Each of these commonly owned patent documents is hereby incorporated by reference in its entirety.

Moreover, the fiber optic cable 10 can include additional layers, such as additional water-swellable layers, cladding layers, and/or a protective jacket (not shown). Such additional components are well within the knowledge of those having ordinary skill in the art.

The water-swellable fabric tape 14 may be a woven or a knit fabric but is more typically a nonwoven fabric. As will be known to those having ordinary skill in the art, nonwovens can be formed by bonding and/or interlocking fibers, either randomly or with directional orientation. Acceptable nonwoven fabrics according to the present invention may be formed from any conventional technique, such as air laying, calendar bonding, hydroentangling, needlepunching, through-air-bonding, stitch-bonding, melt spun-bonding, and melt blowing. See, e.g., *Dictionary of Fiber and Textile Technology*, Hoechst Celanese Corporation (1990); Tortora & Merkel, *Fairchild's Dictionary of Textiles* (7th Edition 1996).

By way of further example, discontinuous polyester fibers may be fluffed, then blended by blowing into an airborne state with water-swellable polyacrylate fibers. The ratio of water-swellable polyacrylate fiber to polyester is determined according to the degree of swelling desired on contact with water. The blend is fed into a combing machine, which not only orients and separates individual fibers but also blends the polyester and polyacrylate fibers. A binder is then applied (e.g., sprayed) to the resulting proto-fabric to loosely bind the constituent fibers into a water-swellable nonwoven fabric. Optionally, the nonwoven fabric may be calendered to control or otherwise modify its thickness (i.e., fluffiness or bulk). The water-swellable nonwoven fabric is then slit to a desired width to create the water-swellable fabric tape.

Those having ordinary skill in the art will appreciate that the water-swellable fabric tape may be constructed to achieve specific properties beneficial to optical fiber cable structures. Filamentary fibers with length to diameter ratios of between about 10 and 100,000, for instance, are useful for forming water-swellable nonwoven fabrics according to the present invention. Moreover, the water-swellable fabric tape 14 may possess an open structure (e.g., a mesh) or a more closed structure (i.e., less, if any, open space between fibers).

As used herein in the context of fabrics, the term "fiber" refers to both cut fibers and continuous filaments. In this regard, the water-swellable fabric tape according to the present invention may be formed from cut fibers and/or continuous filaments (e.g., a water-swellable nonwoven formed from continuous filaments).

To limit microbending and otherwise adequately protect the optical fibers 12, the water-swellable fabric tape 14 should possess one or more exemplary characteristics.

First, the water-swellable fabric tape 14 may be compressible (e.g., compressed by light contact with the optical fiber element). Typically, the water-swellable fabric tapes according to the present invention are sufficiently soft and resilient to cushion optical fibers against pressures that may result from contact between the optical fibers and the water-swellable fabric tape. As set forth herein, the structure of the fabric substrate can be engineered to optimize this property. Alternatively, the water-swellable fabric tape 14 schematically depicted in FIG. 1 might be augmented or replaced by a water-swellable foam tape.

"Compressibility" may be characterized as a decrease in thickness of between about one percent and 90 percent under a load of 1.0 gram per square centimeter. As used herein, compressibility is not a bulk deformation of material, as is the case, for example, with respect to foams or soft rubbers. Rather, compressibility is a change in thickness under light lateral loading due to reorientation of individual fibers in the lightly bonded, fluffy nonwoven fabric. Thus, if an optical fiber element is brought into contact with the water-swellable fabric tape, such as by bending the buffer tube, the water-swellable fabric tape forms a soft cushion to guard against point stresses, which can cause microbending losses.

Second, the water-swellable fabric tape 14 may possess a substantially uniform thickness (i.e., caliper) to minimize point contacts on the optical fibers 12. In contrast, employing water-swellable yarns within the buffer tube is unwieldy. For example, such yarns are difficult to orient both circumferentially and longitudinally within the buffer tube. Moreover, water-swellable yarns also create an uneven interface with the optical fiber elements. The uneven surfaces created by such yarns is thought to lead to preferential nesting positions for the optical fiber elements, which, in turn, causes concentrated pressure where the optical fibers contact the water-swellable yarn. The uniformity of the water-swellable fabric tape according to the present invention not only makes properly positioning the tape within a buffer tube simple and easy but also minimizes the kinds of localized forces that can cause microbending.

Third, the surface of the water-swellable fabric tape 14 facing optical fibers 12 may be substantially smooth. In contrast, some dry inserts, tapes, or yarns are merely substrates coated with water-swellable powders (e.g., having superabsorbent polymer particles bound to the carrier substrate's surface). Such powders are typically hard particles that are either manufactured (or finely ground) to dimensions between about 10 and 500 microns or more. Particle size distributions can vary, of course, but any grade powder will include relatively small and, more critically, relatively large particles. The size and hardness of some of these particles is sufficient to cause microbending and optical attenuation of optical fibers if and when the optical fibers and the particles forcefully contact one another. Moreover, particles might agglomerate (i.e., clump together) to form relatively larger particulate masses that are more likely to cause attenuation problems.

Even when tapes made with water-swellable powders are positioned such that the substrate fabric side faces the optical fiber elements (i.e., the powder-coated side is away), the particulates may still impart stress points on the optical fibers, thereby causing microbending-induced signal losses. In accordance with the present invention, the absence of particulate water-swellable powders, and hence the smoother surface of the water-swellable fabric tape 14, helps to minimize these detrimental optical effects.

In addition, the water-swellable fabric according to the present invention can include water-swellable polymeric fibers and at least one other kind of polymeric fiber.

It is thought that filamentary fibers will lie down and interweave into nonwoven tapes (i.e., either single or multi-layer). In effect, the water-swellable polymeric fibers and the carrier fibers (e.g., polyester) will integrate, thereby achieving a relatively smooth, compliant surface as compared with the surface of substrates that include a coating of water-swellable particulate powder. In other words, the surface of the water-swellable fabric tape according to the present invention will not cause the kind of rigid interfaces that can cause microbending of the optical fibers. Those having ordinary skill in the art will recognize that the respective sizes of the optical fibers, water-swellable fibers, and carrier fibers (if used) can be selected to provide optimal swell performance (as well as suitable properties for manufacturing and suitable properties for reducing optical fiber microbending).

Accordingly, in one embodiment, the water-swellable fabric tape includes a blend of water-swellable fibers and conventional polymeric fibers (e.g., polyester fibers). By way of example, superabsorbent polymeric fibers and polyester fibers can be loosely bonded into an intertwined web that is secured using adhesive (e.g., aqueous glue). Alternatively, the two kinds of fibers may be bonded by employing low-melt binder fibers (i.e., a third kind of fiber).

In another embodiment, the water-swellable fabric tape includes a first layer of water-swellable fibers, which is typically positioned against the buffer tube, and a second layer of soft, resilient synthetic fibers, which is typically positioned against the optical fibers. Water-swellable fabric tapes according to this embodiment might be especially compressible at the tape/optical fiber interface.

In yet another embodiment, the water-swellable fabric tape includes a blend of one kind of water-swellable fibers and a second kind of water-swellable fibers. This embodiment might embrace, for instance, one kind of water-swellable fibers that absorb water relatively more quickly and a second kind of water-swellable fibers that possess relatively more absorbent capacity.

Finally, in yet another embodiment, the water-swellable fabric tape according to the present invention, such as a polymeric nonwoven fabric, possesses an uncompressed density of less than about 300 kg/m$^3$ to promote cushioning of the optical fibers. Typically, the water-swellable fabric tape according to the present invention possesses an uncompressed density of less than about 200 kg/m$^3$ (e.g., 100 kg/m$^3$ or less). Indeed, the use of such low-density (i.e., fluffy) water-swellable tapes not only cushions the optical fibers, but may even permit the attenuation-limiting use of superabsorbent particulate powders and/or water-swellable yarns containing superabsorbent polymers (SAPs). With respect to the latter, water-swellable yarns can be positioned within the buffer tube to provide additional water blocking within the fiber optic cable in a way that limits optical fiber attenuation.

As noted and as schematically depicted in FIG. 1, the fiber optic cable 10 may optionally include an adhesive material 18 for coupling the water-swellable fabric tape 14 to the buffer tube 16 and/or an adhesive material 20 for coupling the optical fibers 12 to the water-swellable fabric tape 14.

With respect to the use of an adhesive material 20 to bond the optical fiber bundle 12 to the water-swellable element 14, the adhesive material 20 may be applied during the buffer tube application process as a single bead or a plurality of beads from a fixed head positioned directly over the optical fibers between the die controlling the positioning of the optical fibers and the water-swellable element applicator. In other embodiments, adhesive material 20 may be embedded in water-swellable element 14 in a manner that will permit it to bond the water-swellable element 14 to the optical fibers 12.

The die here may be an apparatus that positions the optical fibers (e.g., arranges all the ribbons together into a stack). The die and ribbon payoffs may be in a "tree" that rotates while everything else is fixed. Thus, the ribbon stack may be twisted helically as it is fed into the buffer tube extruder head. Accordingly, a bead of adhesive material 20, in effect, may spiral around the ribbon stack, passing over the corners and over each side of the stack before the water-swellable tape is applied. Alternatively, the bead applicator may be mounted on a rotating fixture such that the bead or beads may be applied only onto the corners of the ribbon stack, or onto the top and bottom of the ribbon stack, or only onto the sides of the ribbon stack.

The particular application arrangement of adhesive material 20 is not intended to be limited to a single bead. For example, two beads positioned a certain number of degrees apart, such as, for example, 180° apart, may be applied to help keep the stack better centered and well-cushioned against contact with the water-swellable element and buffer tube wall and to maintain stack integrity. The adhesive material 20 may also be applied as a film directly onto the water-swellable tape before it is wrapped around the ribbon stack. Other shapes and numbers of adhesive beads may be utilized as well. In this aspect of the invention, the intention is to adhesively couple the ribbon stack to the water-swellable tape.

Advantageously, the adhesive may be foamed (e.g., silicone foam) to further reduce the modulus of the material. The degree of foaming, measured by percent reduction in adhesive density from the fully non-foamed state, may be, for example, from one percent to 95 percent. Typically, the degree of foaming may be 20 percent to 80 percent. More typically, the degree of foaming may be from 40 percent to 60 percent. The foamed adhesive material may fill from one percent to virtually 100 percent of the free space inside the water-swellable element, typically from one percent to 50 percent of the free space, more typically from one percent to 20 percent of the free space.

In another embodiment, the foam may be applied as small discrete domains of the adhesive material 20, such as silicone foam, sputtered onto water-swellable element 14. In yet another embodiment, the foam may be applied as small, discrete domains of the adhesive material 20 sputtered onto the optical fiber bundle 12 (e.g., a ribbon stack of optical fibers). Under either embodiment, the minutely localized application of the adhesive foam may be generated, for example, by the addition of gas from an external source, by a chemical reaction internal to the material, or by the addition of material that expands due to heat. By way of specific example, the adhesive material 20 may be dispersed onto the optical elements using a high velocity gas.

Such techniques, which will be understood by those having ordinary skill in the art, can achieve small dots (i.e., discrete domains) of adhesive foam that can provide satisfactory adhesive coupling of the water-swellable element 14 and the optical fiber bundle 12. For instance, dots of adhesive material (e.g., having diameters averaging less than one millimeter or so) may be, on a relative basis, widely dispersed (e.g., spaced more than about one millimeter from adjacent dots of adhesive material). Those having ordinary skill in the art will understand that the application of adhesive material 20 should be sufficient to develop the desired adhesive coupling between the water-swellable element 14 and the optical fiber bundle 12 (i.e., less adhesive material and wider dispersion yields a relatively weaker bond). According to this aspect of the invention, adhesive bonding typically provides the predominant coupling force between the water-swellable element 14 and the optical fiber 12.

As with other application methods, the particular application of the adhesive material 20 is not intended to be limited to a single method. Foamed adhesive material 20, for example, may be applied (e.g., sprayed) to the optical fiber bundle 12 and/or the water-swellable element 14 in one or more controlled streams. This can regularly distribute the adhesive material 20 over all or part of the optical fiber bundle 12 and/or the water-swellable element 14 to achieve, for instance, a pattern of discontinuously spaced adhesive material 20. Alternatively, the foamed adhesive material 20 may be applied less systematically to the optical fiber bundle 12 and/or the water-swellable element 14 thereby yielding a more random, discontinuous application of adhesive material 20.

The step of applying adhesive material may be performed at various times during the fabrication process. The adhesive material may be applied (e.g., sputtered) onto the water-swellable tape or the ribbon stacks well before the water-swellable tape and the ribbon stack are coupled. More typically, the adhesive material is applied to the water-swellable tape (or to the ribbon stack) as the water-swellable tape is formed around the ribbon stack. The discontinuous adhesive material may be integrated into the water-swellable element so that, during the application of a protective casing (e.g., extrusion or placement of a polymeric buffer tube or polymeric jacket), shearing forces between the optical fiber bundle and the water-swellable element will not remove the adhesive material 20. Of course, any application method is acceptable provided the adhesive functions to couple the optical fiber bundle (e.g., the ribbon stack) and the water-swellable element (e.g., the water-swellable tape).

One advantage of employing discrete domains of the adhesive material (e.g., discontinuous foam dots) is that it provides adequate coupling of the optical fiber bundle and the water-swellable element yet minimizes physical contact with the optical elements. In other words, it is thought that reducing the surface area of the adhesive material that contacts the optical elements will reduce the potential for microbending.

The composition of adhesive material is not particularly limited. It may include a hot melt adhesive, such as, for example, an ethylene-vinyl acetate, an ethylene-butyl acetate, or an ethylene-ethyl acetate, or it may include styrene-butadiene block copolymer blends with oils, a thermoplastic urethane, a thermoset urethane or other thermoset composition, or a polyvinyl butyral. Adhesive material 20 may even include a polypropylene or another polyolefin.

For example, adhesive material 20 may include a block copolymer of styrene end-blocks with a butylene or an ethylene-butylene mid-block. The styrene end-blocks on the molecules may associate as the rubber in the blend cools, forming pseudo-crosslinks and giving the blend the characteristics of a cross-linked solid while remaining soft through a broad temperature range. An example of such an adhesive is Master Adhesive's MA-145 product.

Adhesive material 20 may also be a curing material, such as, for example, any of the radiation-curable materials or thermally curing materials discussed herein with respect to curable adhesive material 18 (i.e., the optional adhesive material 18 for coupling the water-swellable element to the buffer tube).

Examples of radiation-curable materials include Shin-Etsu's OF212 and OF207 radiation-curable silicone acrylates, and DSM Desotech's 3471-1-135 radiation-curable urethane acrylate. Such materials are fast-curing with applied actinic radiation and typically possess low Young's modulus to minimize stress on the optical fibers or optical fiber bundles.

An example of a thermally curing material which may be used as a curable adhesive material is a two-part, room temperature vulcanizing (RTV) silicone, such as GE RTV615, which may be foamed before application in the buffer tube. Another example is a RTV silicone self-foams within a few seconds of its application, such as, for example, Dow Corning's 3-8159 RF silicone foam. Another example is a two-part urethane, which also may be foamed during mixing or which can be formulated to self-foam during the curing process. Examples of the latter are Reoflex urethane rubbers sold by Smooth-On Corp. These kinds of materials can also be formulated with very low modulus that does not change substantially with the kinds of temperature excursions encountered in the environments in which optical fiber cables may be deployed.

In the specification and FIGURE, typical embodiments of the invention have been disclosed. The present invention is not limited to such exemplary embodiments. Unless otherwise noted, specific terms have been used in a generic and descriptive sense and not for purposes of limitation.

The invention claimed is:

1. A fiber optic cable, comprising:
an optical fiber bundle of one or more optical fibers;
a buffer tube enclosing said optical fiber bundle;
a dry water-swellable element, wherein said water-swellable element (i) is disposed between said optical fiber bundle and said buffer tube, (ii) substantially encloses said optical fiber bundle, and (iii) is substantially free of superabsorbent particulate powders; and
a plurality of discrete domains of adhesive foam adhesively coupling said water-swellable element and said optical fiber bundle.

2. A fiber optic cable according to claim 1, wherein said water-swellable element possesses a compressibility of between about one percent and 90 percent under a load of 1.0 gram per square centimeter.

3. A fiber optic cable according to claim 1, wherein said water-swellable element comprises a nonwoven fabric that includes water-swellable polymeric fibers.

4. A fiber optic cable according to claim 1, wherein said water-swellable element comprises a woven fabric that includes water-swellable polymeric fibers.

5. A fiber optic cable according to claim 1, wherein said water-swellable element comprises a knit fabric that includes water-swellable polymeric fibers.

6. A fiber optic cable according to claim 1, wherein the fiber optic cable is essentially free of thixotropic filling gel or grease.

7. A fiber optic cable according to claim 1, wherein said water-swellable element possesses an uncompressed density of less than about 300 kg/m$^3$.

8. A fiber optic cable according to claim 1, wherein said water-swellable element possesses an uncompressed density of less than about 100 kg/m$^3$.

9. A fiber optic cable, comprising:
an optical fiber bundle including a plurality of optical fibers;
a buffer tube enclosing said optical fiber bundle;
a water-swellable tape comprising water-swellable polymeric fibers, wherein said water-swellable tape (i) is positioned between said optical fiber and said buffer tube, (ii) substantially surrounds said optical fiber bundle, and (iii) is substantially free of a superabsorbent-powder coating; and a plurality of discrete domains of adhesive material adhesively coupling said water-swellable tape and said optical fiber bundle.

10. A fiber optic cable according to claim 9, wherein said plurality of discrete domains of adhesive material adhesively coupling said water-swellable tape and said optical fiber bundle provides the predominant coupling force between said water-swellable tape and said optical fiber bundle.

11. A fiber optic cable according to claim 9, wherein said plurality of discrete domains of adhesive material adhesively coupling said water-swellable tape and said optical fiber bundle comprises discrete domains of adhesive foam that are provided on said optical fiber bundle.

12. A fiber optic cable according to claim 9, wherein said plurality of discrete domains of adhesive material adhesively coupling said water-swellable tape and said optical fiber bundle comprises discrete domains of adhesive foam that are provided on said water-swellable tape.

13. A fiber optic cable according to claim 9, wherein said plurality of discrete domains of adhesive material adhesively coupling said water-swellable tape and said optical fiber bundle comprises discrete domains of adhesive foam (i) having an average diameter of less than about one millimeter and (ii) being spaced from one another by at least about one millimeter.

14. A fiber optic cable according to claim 9, wherein said optical fiber bundle comprises a ribbon stack.

15. A fiber optic cable according to claim 9, wherein said optical fiber bundle comprises two or more optical fibers that are helically wound around each other.

16. A fiber optic cable according to claim 9, wherein said water-swellable tape comprises a nonwoven fabric tape, said nonwoven fabric tape comprising (i) superabsorbent polymer fibers and (ii) at least one other kind of fiber.

17. A fiber optic cable according to claim 9, wherein said water-swellable tape comprises a nonwoven fabric tape, said nonwoven fabric tape comprising at least two kinds of water-swellable fibers.

18. A fiber optic cable according to claim 9, wherein said water-swellable tape possesses a substantially uniform thickness and a substantially smooth surface.

19. A fiber optic cable according to claim 9, wherein said water-swellable tape is a nonwoven fabric tape that is substantially free of water-swellable particulates.

20. A fiber optic cable according to claim 9, wherein said water-swellable tape possesses an uncompressed density of less than about 200 kg/m$^3$.

21. A fiber optic cable according to claim 9, wherein said water-swellable tape possesses an uncompressed density of less than about 100 kg/m$^3$.

22. A method of making a dry fiber optic cable, comprising:
providing a ribbon stack of optical fibers;
providing a water-swellable tape that is substantially free of superabsorbent particulates;
applying discrete domains of adhesive foam to the ribbon stack of optical fibers and/or the water-swellable tape to provide adhesive coupling between the ribbon stack of optical fibers and the water-swellable tape;
substantially enclosing the ribbon stack of optical fibers within the water-swellable tape, whereby the discrete domains of adhesive foam adhesively couple the ribbon stack of optical fibers and the water-swellable tape; and
forming a polymeric tube or jacket around both the ribbon stack of optical fibers and the water-swellable tape.

23. A method according to claim 22, wherein the step of providing a water-swellable tape that is substantially free of superabsorbent particulates comprises providing a nonwoven fabric that (i) includes water-swellable polymeric fibers and (ii) possesses a compressibility of between about one percent and 90 percent under a load of 1.0 gram per square centimeter.

24. A method according to claim 22, wherein the step of providing a water-swellable tape that is substantially free of superabsorbent particulates comprises providing a water-swellable tape possessing an uncompressed density of less than about 100 kg/m$^3$.

25. A method according to claim 22, wherein the step of applying discrete domains of adhesive foam to the ribbon stack of optical fibers and/or the water-swellable tape comprises applying discrete domains of adhesive foam (i) having an average diameter of less than about one millimeter and (ii) being spaced from one another by at least about one millimeter.

* * * * *